May 8, 1962 H. W. ASCHINGER 3,033,919
CABLE TERMINAL
Filed Aug. 20, 1959 2 Sheets-Sheet 1

INVENTOR.
Harold W. Aschinger
BY Karl Huber Attorney
John Kovalick Agent

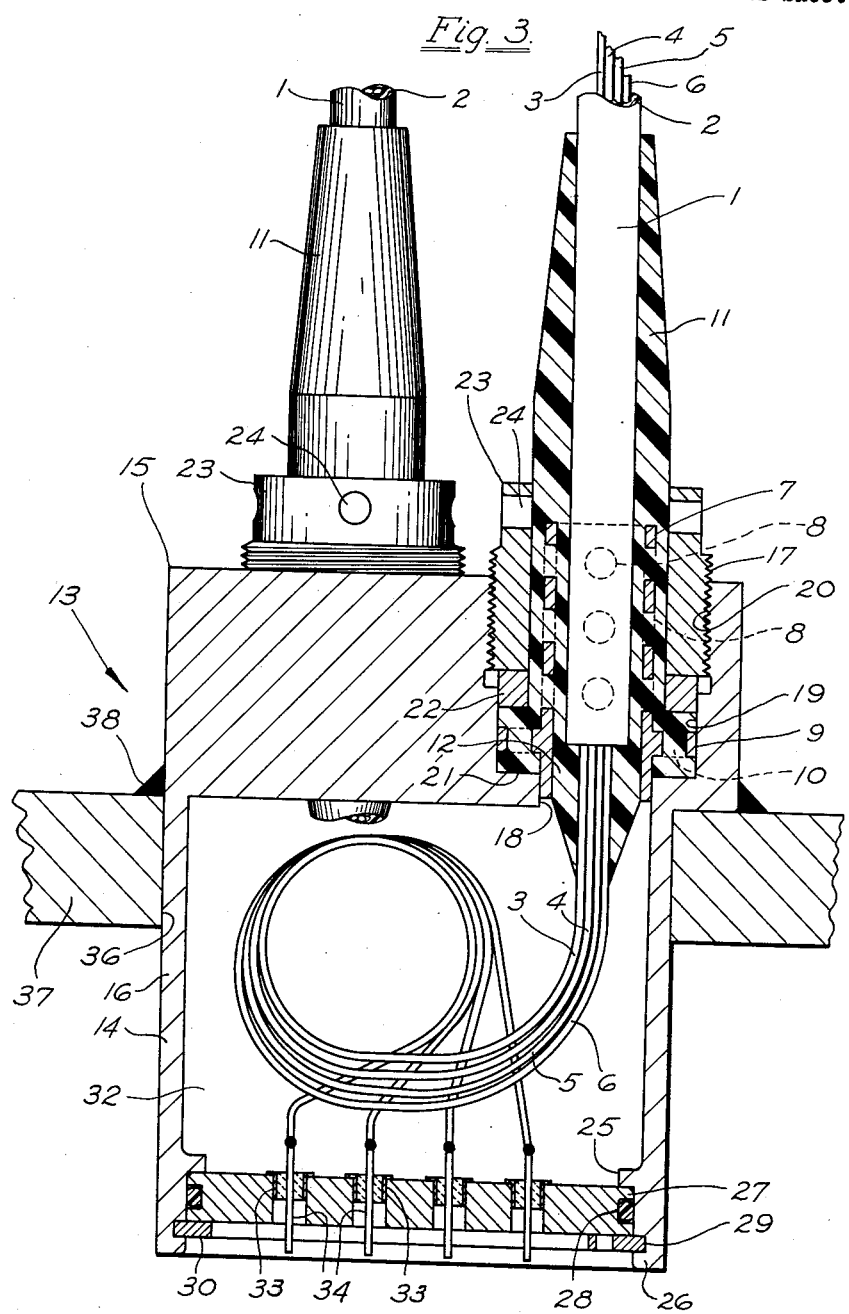

3,033,919
CABLE TERMINAL
Harold W. Aschinger, Ridgefield, N.J., assignor, by mesne assignments, to Vare Industries, Roselle, N.J., a corporation of New Jersey
Filed Aug. 20, 1959, Ser. No. 835,076
2 Claims. (Cl. 174—151)

The present invention deals with a cable terminal and more particularly with a hermetically sealed cable terminal and housing therefore.

Sheathed cables of the type employed as electrical transmission cables for high pressure application, e.g. for high pressure under water application, are connected to hermetically sealed underwater housings, e.g. underwater buoys, encasing electrical apparatus. When the cable sheath is accidentally cut or ruptured, especially under ambient high water pressure, water is forced into the cable through the cut or rupture and along the interstices of the plural wire cable core and into the hermetically sealed apparatus housing. The water either fills the internal cavity of the apparatus housing and causes the housing to sink or otherwise results in short-circuiting of the contained electrical components.

It is an object of the present invention to provide a hermetically sealed cable terminal for a sheathed cable.

It is another object of the present invention to provide a hermetically sealed housing for a hermetically sealed cable terminal.

It is a further object of the invention to provide a hermetically sealed housing therefore.

Figure 1:
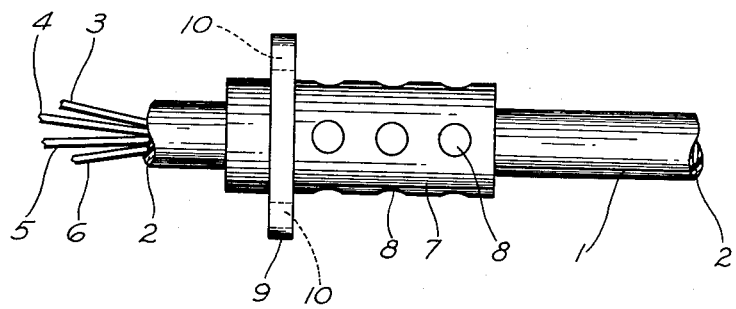
Figure 2:
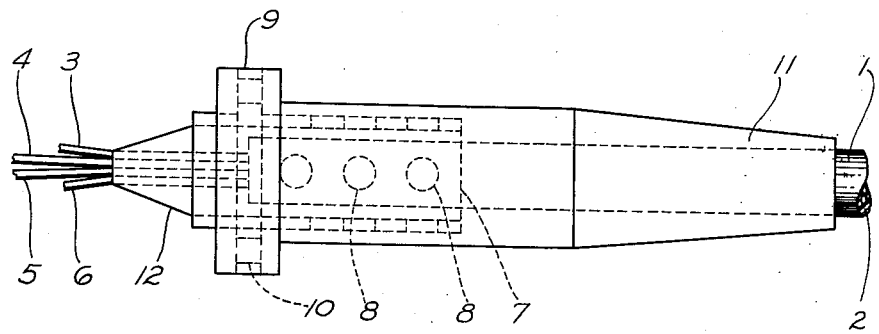

Other objects and advantages of the invention will become apparent from the description hereinafter following and the drawings forming a part hereof, in which:

FIGURE 1 illustrates an elevational view of a cable terminal component mounted on a sheathed cable, FIGURE 2 illustrates an elevational view of a hermetically sealed cable terminal, and FIGURE 3 illustrates a partly elevational and partly cross-section view of a cable terminal mounted in a hermetically sealed housing.

The invention deals with a hermetically sealed cable terminal for a sheathed cable in combination with a hermetically sealed housing therefore, whereby an apparatus housing is protected against leakage under high water pressure when the cable is damaged and would otherwise permit water under pressure from entering the apparatus housing.

Regarding FIGURES 1 and 2, a cable 1 comprising a sheath 2 covering a plural wire core composed of electrical conducing wires 3, 4, 5 and 6 is provided with a rigid sleeve 7, e.g. a metal sleeve, mounted over an end portion thereof. The sleeve 7 is provided with a plurality of apertures 8 through the sleeve, and with a circumferential collar 9 on the sleeve and spaced from an end thereof. The collar 9 is provided with a plurality of apertures 10 therethrough in a direction axially of the sleeve. A portion of the sheath 2 is removed from an end of the cable exposing the wires 3, 4, 5, 6 and the rigid sleeve is moved to cover a portion of the lengths of the exposed wires. Thereafter, the end portion of the cable 1, including the sleeve 7, is covered with a layer of elastic material, e.g. rubber, and pressure molded to provide a molded elastic coat 11 with the sleeve 7 embedded therein, and wherein the molded elastic material is further anchored to the cable sheath 1 through the apertures 8 as illustrated by FIGURES 2 and 3. In addition to the coat 11, the pressure molding operation causes the elastic material to flow into an end of the sleeve over the exposed wires positioned within the sleeve whereby an integral plug 12 is formed and embeds the wires 3, 4, 5 and 6 therein. The plug extends outwardly along the wires forwardly of the end of the embedded sleeve 7, and the cable wires are thereby effectively hermetically sealed in the sleeve 7.

A terminal metal housing 13, according to FIGURE 3, is provided and comprises a cup-shaped body 14 having a substantially heavy base 15 with thinner side walls 16. At least one aperture 17 is formed through the base 15, the aperture comprising a bore 18 terminating in the inner face of the base 15 and merging with a counterbore 19 through the outer face of the base 15, the counterbore having an internal thread 20, with the bore and counterbore providing a collar seat 21. The coated and hermetically sealed terminal comprising cable 1, sleeve 7 and coating 11, is inserted into aperture 17 with one face of the coated collar 9 seated on collar seat 20 and the plug 12 extending into the cup cavtiy. A washer 21 is fitted over the coated terminal and abuts against the other face of coated collar 9. An externally threaded nut 23 is fitted over the coated terminal and engages the internal threads 19 of counterbore and is screwed into the aperture by means of spanner wrench grips 24 until the washer 22 pressurizes the coated collar 9 sufficiently to deform the elastic coat 11 and press the elastic material of the coating against all surfaces contacting the collar coating, whereby the aperture is hermetically sealed.

An internal flange 25 is provided on the internal surface of the cup wall 16 inwardly of the lip 26 of the cup 14. A circular plate 27 having a peripheral groove 28 is mounted in the cup 14 and is seated on flange 25. An internal annular recess 29 is formed in the inner wall 16 spaced from the flange 25, and the plate 27 is positioned between the flange and recess. A slip ring 30 is mounted in recess and retains the plate 27 in locked position between the flange and recess, with the plate positioned below the lip 26. An O-ring 31 is located in the annular groove 28 for hermetically sealing the cavity 32 of housing 13.

The plate 27 is provided with a plurality of inserts 33, e.g. glass inserts capable of providing glass-to-metal seals between the inserts and plate. A conductor 34 is hermetically sealed through each of the inserts 33, one end of each conductor passing outwardly of the housing 13 for connection to electrical components and the other end of each conductor passing into sealed cavity 32. Individual cable core wires 3, 4, 5 and 6 are each connected to an insert conductor wire 34 inside the cavity 32.

The cable terminal housing 13 passes through a aperture 36 in the wall 37 of an apparatus housing 37 and is welded thereto as at 38.

In operation, the base 15 of cable terminal housing 13 is on the pressure side of the apparatus housing 37. Consequently, high water pressures on the elastic terminal coat 11 which may be transmitted between the cable and cable housing fittings merely further pressurize the elastic coating on the collar 9 and increases the sealing effect of the collar coating against the surfaces thereby contacted.

Various modifications are contemplated within the scope of the appended claims.

What is claimed is:

1. A terminal seal for a sheathed electrical cable comprising said cable, a rigid sleeve on an end portion of the cable, apertures through the wall portion of the sleeve, a circumferential collar on the sleeve, an elastic coating embedding the sleeve and collar and forming a layer of coating material between the cable and the sleeve, the coated collar extending radially outwardly of the coated sleeve, a wall having an aperture formed therethrough annular abutment means in said aperture, one surface of the coated collar being seated in said aperture in abutment with the abutment means, washer means mounted in said aperture in abutment with another surface of the coated collar, and pressure means mounted in said aperture in abutment with the washer means for pressurizing the coated collar.

2. A terminal seal for a sheathed electrical cable comprising said cable, a sleeve on an end portion of the cable, a circumferential collar on the sleeve, an elastic coating embedding the sleeve and collar and forming a layer of coating material between the cable and the sleeve, the coated collar extending radially outwardly of the coated sleeve, a wall having an aperture formed therethrough, annular abutment means in said aperture, one surface of the coated collar being seated in said aperture in abutment with the abutment means, washer means mounted in said aperture in abutment with another surface of the coated collar, and pressure means mounted in said aperture in abutment with the washer means for pressurizing the coated collar.

References Cited in the file of this patent
UNITED STATES PATENTS

| | | |
|---|---|---|
| 2,396,872 | Miller et al. | Mar. 19, 1946 |
| 2,651,672 | Ivanoff | Sept. 8, 1953 |
| 2,750,436 | Richter | June 12, 1956 |
| 2,783,298 | Brown et al. | Feb. 26, 1957 |
| 2,890,268 | Berry | June 9, 1960 |